(12) United States Patent
Kukucka et al.

(10) Patent No.: US 7,389,650 B2
(45) Date of Patent: Jun. 24, 2008

(54) COOLED INSTRUMENT PANEL COMPARTMENT FOR A VEHICLE

(75) Inventors: Richard Kukucka, Ann Arbor, MI (US); L. John Ozark, Jr., Grosse Pointe Woods, MI (US); John Jezuit, Oakland, MI (US); Calin Marginean, Lake Orion, MI (US); Robert Dubiel, Sterling Heights, MI (US); Jeffrey I Godshall, Royal Oak, MI (US); Ryan C Nagode, West Bloomfield, MI (US)

(73) Assignee: Chrysler LLC, Auburn Hills, MI (US)

( * ) Notice: Subject to any disclaimer, the term of this patent is extended or adjusted under 35 U.S.C. 154(b) by 282 days.

(21) Appl. No.: 11/267,690

(22) Filed: Nov. 4, 2005

(65) Prior Publication Data

US 2007/0101741 A1 May 10, 2007

(51) Int. Cl.
  *B60H 1/32* (2006.01)
(52) U.S. Cl. .................. 62/244; 62/457.3; 296/37.12
(58) Field of Classification Search .......... 62/239, 62/244, 457.3–457.4; 296/37.12, 37.8
See application file for complete search history.

(56) References Cited

U.S. PATENT DOCUMENTS

| | | | | |
|---|---|---|---|---|
| 2,902,838 A | * | 9/1959 | Nichols | 62/244 |
| 4,892,138 A | * | 1/1990 | Bibik, Jr. | 165/80.1 |
| 5,165,646 A | * | 11/1992 | Gewecke | 248/311.2 |
| 5,197,775 A | * | 3/1993 | Reeber | 296/37.12 |
| 5,203,833 A | * | 4/1993 | Howell | 165/41 |
| 5,701,754 A | * | 12/1997 | Choi et al. | 62/244 |
| 6,070,927 A | * | 6/2000 | Mieglitz et al. | 296/37.12 |
| 6,155,063 A | * | 12/2000 | Felde | 62/244 |
| 6,231,099 B1 | * | 5/2001 | Greenwald | 296/37.8 |
| 6,560,983 B1 | * | 5/2003 | Schimmeyer | 62/244 |
| 6,640,551 B1 | * | 11/2003 | Slone et al. | 62/3.61 |
| 6,971,697 B2 | * | 12/2005 | Morales | 296/37.1 |
| 7,073,338 B2 | * | 7/2006 | Harwood et al. | 62/3.61 |
| 2005/0178128 A1 | | 8/2005 | Harwood et al. | |

FOREIGN PATENT DOCUMENTS

| | | |
|---|---|---|
| DE | 3739 151 A1 | 7/1988 |
| DE | 3739151 A1 | 7/1988 |
| DE | 9418170 | 1/1995 |
| DE | 10 2005 009 353 A1 | 9/2005 |
| DE | 102005009353 A1 | 9/2005 |
| EP | 0865962 A1 | 9/1998 |
| JP | 57138415 | 8/1982 |
| JP | 57138415 A | 8/1982 |
| WO | 0013935 | 3/2000 |

* cited by examiner

*Primary Examiner*—William E Tapolcai
(74) *Attorney, Agent, or Firm*—Thomas A. Jurecko

(57) ABSTRACT

A glove box assembly for a vehicle is provided. The glove box assembly includes a storage bin and a dedicated climate controlled bin. The climate controlled bin is arranged to receive cooled air from a vehicle heating, ventilation and air conditioning (HVAC) unit for cooling the climate controlled bin independent of the storage bin. The glove box assembly further includes a cooled air inlet. The cooled air inlet is arranged to draw cooled air from the HVAC unit upstream of a blend door when air conditioning is operating so as to provide cooled air to the climate controlled bin independent of a vehicle cabin temperature setting.

17 Claims, 2 Drawing Sheets

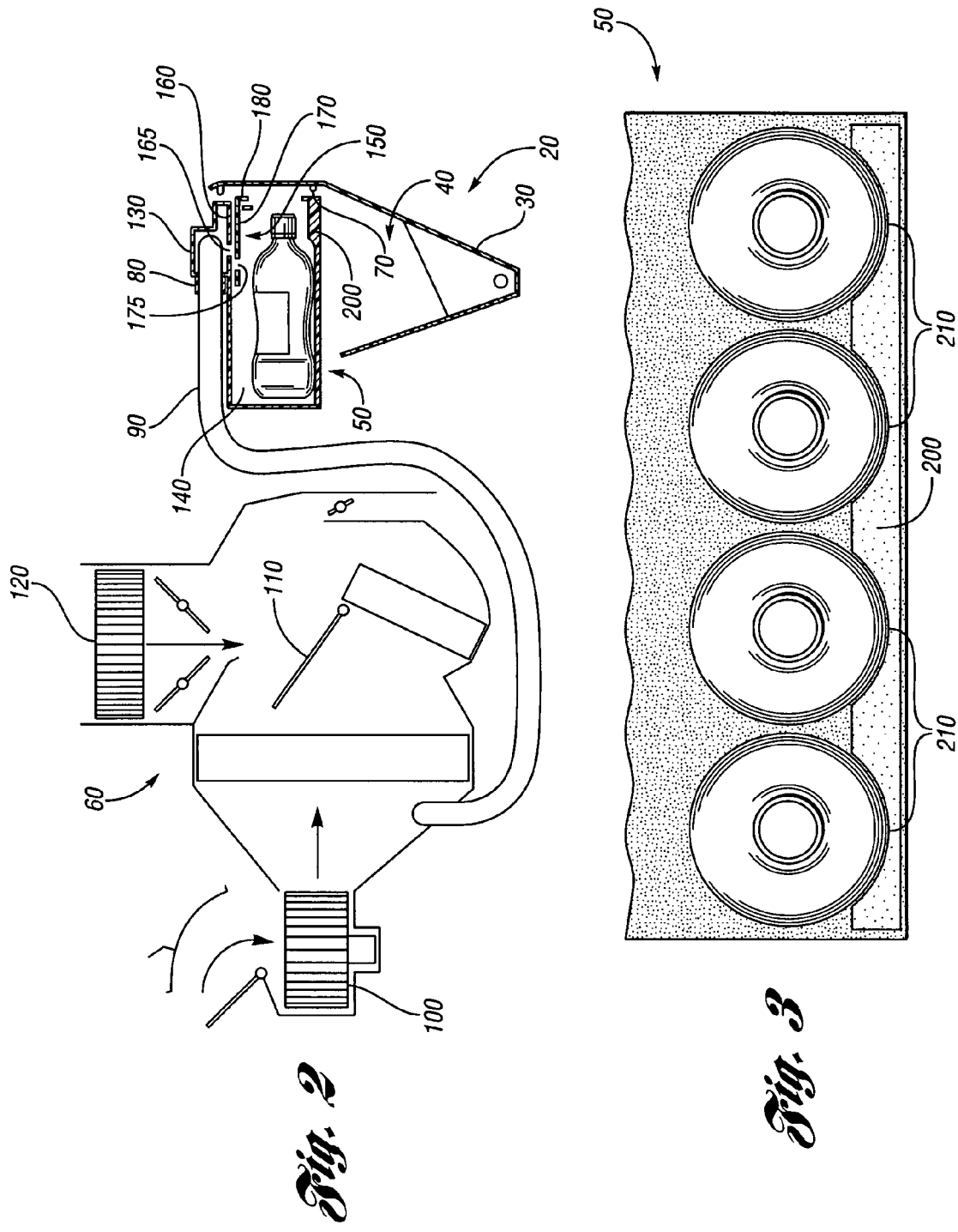

COOLED INSTRUMENT PANEL COMPARTMENT FOR A VEHICLE

FIELD OF INVENTION

The present invention relates generally to a cooled instrument panel compartment for a vehicle.

BACKGROUND OF INVENTION

Motor vehicles today are used for many purposes including commuting and trips of long duration. During such trips, for example, vehicle occupants often bring food and chilled beverages for consumption and such beverages are typically placed in various cup holders provided in today's vehicles. One disadvantage of the typical cup holders is that the chilled beverages often warm up to ambient vehicle temperature before or during their consumption. To counteract this disadvantage, a cooler is sometimes used by vehicle occupants to keep their beverages cool before consumption. Using such a cooler however, requires using vehicle space that could be used by an occupant or placing the cooler in a vehicle.

Thus, there is a need for a cooled instrument panel compartment that overcomes the aforementioned and other disadvantages.

SUMMARY OF INVENTION

Accordingly, a cooled instrument panel compartment for a vehicle is provided. In accordance with one aspect of the present invention, a glove box assembly is provided and includes a storage bin and a dedicated climate controlled bin. The climate controlled bin is arranged to receive cooled air from a vehicle heating, ventilation and air conditioning (HVAC) unit for cooling the climate controlled bin independent of the storage bin.

In accordance with one aspect of the present invention, the glove box assembly includes a cooled air inlet. The cooled air inlet is arranged to draw cooled air from the HVAC unit upstream of a blend door when air conditioning is operating so as to provide cooled air to the climate controlled bin independent of a vehicle cabin temperature setting.

BRIEF DESCRIPTION OF DRAWINGS

Other aspects, features, and advantages of the present invention will become more fully apparent from the following detailed description of the preferred embodiment, the appended claims, and in the accompanying drawings in which:

FIG. 2 illustrates a simplified view of a HVAC assembly interacting with the dedicated climate controlled bin of the glove box assembly in accordance with the present invention; and FIG. 3 illustrates a partial front view of the dedicated climate control bin having a removable liner in accordance with the present invention.

DETAILED DESCRIPTION OF EXEMPLARY EMBODIMENT(S)

Figure 1:
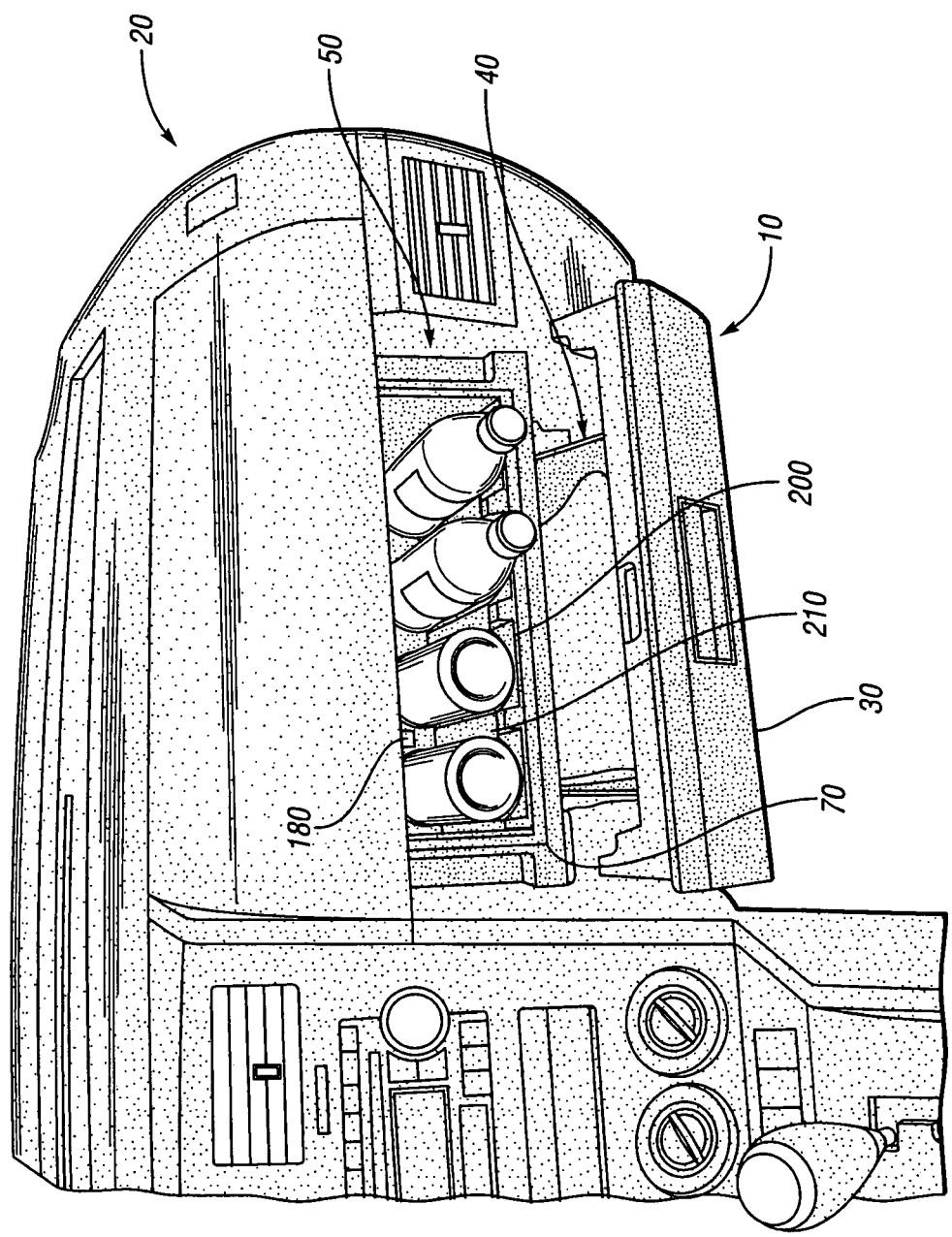
FIG. 1 illustrates a vehicle glove box assembly having a dedicated climate controlled bin in accordance with the present invention.

In the following description, several well-known features of an instrument panel and glove box are not shown or described so as not to obscure the present invention. Referring now to the drawings, FIGS. 1-3 illustrate an exemplary embodiment of a glove box assembly 10 incorporated into an instrument panel module 20 in accordance with the present invention.

Glove box assembly 10 includes a door 30 arranged to pivot between a closed position and an open position as best shown in FIGS. 1 and 2. In the open position, door 30 provides access to a storage bin 40 and a dedicated climate controlled bin 50. The climate controlled bin 50 is a separate bin and functions independently from storage bin 40.

The dedicated climate controlled bin 50 has a rectangular shape and is arranged to interact with a vehicle HVAC system 60 (FIG. 2) to provide selective cooled air to the climate controlled bin 50 while not cooling the storage bin 40. The climate controlled bin 50 includes a seal 70 positioned on an outer perimeter of the bin and arranged to engage door 30 when door 30 is in a closed position. Alternatively, seal 70 could be positioned on door 30 so as to engage the outer perimeter of climate controlled bin 50 when door 30 is in the closed position.

As best shown in FIG. 2, the dedicated climate controlled bin includes an air inlet 80 arranged to be connected to a hose 90 that is connected to HVAC system 60 for providing the climate controlled bin with selective cooled air from HVAC system 60. Hose 90 is connected to HVAC system 60 down stream of an evaporator 100, but upstream of a blend air door 110 so as to provide cooled air to the dedicated climate controlled bin 50 when an air conditioning (AC) system is on regardless of a vehicle cabin temperature setting. More specifically, by placing hose 90 upstream of blend air door 110 and thus heater core 120, so long as the AC is on, hose 90 receives cooled air regardless of any warm air from the heater core 120 that is blended via the blend air door 110 to achieve a desired cabin temperature setting.

Air inlet 80 directs cooled air into an upper portion 130 of the dedicated climate controlled bin 50. Upper portion 130 is separated from a lower portion 140 by an internal, adjustable air vent arrangement 150. The internal venting arrangement 150 includes a perforated panel 160 fixed to climate controlled bin 50 and a translatable perforated panel 170 arranged to cooperate with fixed perforated panel 160 to open or block cooled air from upper portion 130 to lower portion 140. More specifically, translatable panel 170 is arranged to slide so as to align perforations 165 and 175 of panels 160 and 170, respectively, and thus allow cooled air into lower portion 140 and thus cool any contents of the dedicated climate controlled bin 50, or to have the perforations 175 of translatable panel 170 not align with the perforations 165 of fixed panel 160 so as to block off cooled air from upper portion 130 and not cool the dedicated climate controlled bin 50. A vehicle operator can translate panel 170 via a handle arrangement, such as handle 180 shown in FIGS. 1 and 2.

The climate controlled bin 50 also includes a removable liner 200. Removable liner 200 can comprise many configurations depending on what type of contents are desired to be cooled in the climate controlled bin. In this exemplary embodiment, removable liner 200 includes four scallops 210 arranged to receive beverage containers and prevent the containers from rolling in the dedicated climate controlled bin 50 as best shown in FIG. 3. Scallops 210 are sized such that typical beverage containers such as a 12 ounce can or a 20 ounce plastic bottle are held in place and up to four or either container can be easily placed and cooled in the dedicated climate controlled bin 50.

In operation, the dedicated climate controlled bin effectively provides a built in cooler for a vehicle that is incorporated into a glove box assembly while remaining independent from a storage area of the glove box assembly. With the dedicated climate controlled bin, a vehicle occupant can continue to use the storage area of the glove box while also being able to selectively cool desired items in a separate bin independent from the glove box storage area which will not receive the cooled air.

The vehicle occupant can also cool desired items in the dedicated climate controlled bin with the AC on regardless of a desired vehicle cabin temperature. Thus, even if a vehicle occupant selects a cabin temperature that requires blending warm air with air conditioned air, the dedicated climate controlled bin will only receive cooled air from the HVAC unit because the dedicated climate controlled bin receives the cooled air from upstream of the blend air door.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A climate-control system for a vehicle comprising:
   an evaporator operable to cool a first air stream;
   a heater core operable to heat a second air stream;
   a flow-control door in fluid communication with and disposed between said evaporator and said heater core, said flow-control door operable to blend said first air stream from said evaporator with said second air stream from said heater core to achieve a set-point temperature within an interior of the vehicle; and
   a conduit in fluid communication with said evaporator between said evaporator and said flow-control door and in selective fluid communication with a storage compartment of the vehicle to supply said storage compartment with said first air stream prior to said first air stream encountering said flow-control door.

2. The climate-control system of claim 1, wherein said storage compartment includes a first compartment in selective fluid communication with said conduit and a second compartment spaced apart from said conduit.

3. The climate-control system of claim 2, wherein said second compartment is sealed from said first compartment when a door of said storage compartment is in a closed position.

4. The climate-control system of claim 1, further comprising a plate disposed proximate to a junction of said conduit and said storage compartment, said plate movable between an open position permitting said first air stream into said storage compartment and a closed position restricting entry of said first air stream into said storage compartment.

5. The climate-control system of claim 4, wherein said plate is translatable relative to said storage compartment between said open position and said closed position.

6. The climate-control system of claim 1, wherein a temperature of air supplied to said storage compartment via said conduit is constant regardless of said set-point temperature.

7. The climate-control system of claim 1, wherein said storage compartment is a glove compartment.

8. In a vehicle including an evaporator and a heater core, an instrument panel comprising:
   a first conduit fluidly coupling the evaporator and the heater core;
   a flow-control door disposed within said first fluid conduit and in fluid communication with the evaporator and the heater core, said flow-control door operable to blend air from the evaporator with air from the heater core to achieve a set-point temperature within an interior of the vehicle;
   a second conduit fluidly coupled to said first conduit between the evaporator and said flow-control door; and
   a storage compartment in selective fluid communication with said second conduit and receiving conditioned air from the evaporator via said second conduit.

9. The instrument panel of claim 8, wherein said storage compartment includes a first compartment in selective fluid communication with said second conduit and a second compartment spaced apart from said second conduit.

10. The instrument panel of claim 9, wherein said second compartment is sealed from said first compartment when a door of said storage compartment is in a closed position.

11. The instrument panel of claim 8, further comprising a plate disposed proximate to a junction of said second conduit and said storage compartment, said plate movable between an open position permitting air from the evaporator into said storage compartment and a closed position restricting entry of air from the evaporator into said storage compartment.

12. The instrument panel of claim 11, wherein said plate is translatable relative to said storage compartment between said open position and said closed position.

13. The instrument panel of claim 8, wherein a temperature of air supplied to said storage compartment via said second conduit is constant regardless of said set-point temperature.

14. The instrument panel of claim 8, wherein said storage compartment is a glove compartment.

15. The instrument panel of claim 8, wherein said storage compartment includes a removable liner.

16. The instrument panel of claim 15, wherein said liner includes a scallop that supports an article within said storage compartment.

17. The instrument panel of claim 15, wherein said liner includes a plurality of scallops operable to support four beverage containers.

* * * * *